United States Patent
Chan

(10) Patent No.: US 10,462,557 B1
(45) Date of Patent: Oct. 29, 2019

(54) ANTI-VIBRATION STRUCTURE OF A SPEAKER AND ANTI-VIBRATION METHOD FOR THE SAME

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

( * ) Notice: Subject to any disclaimer, the term of this patent is extended or adjusted under 35 U.S.C. 154(b) by 0 days.

(21) Appl. No.: 16/121,698

(22) Filed: Sep. 5, 2018

(30) Foreign Application Priority Data

Aug. 21, 2018 (CN) .......................... 2018 1 0951731

(51) Int. Cl.
*H04R 1/28* (2006.01)
*H04R 1/02* (2006.01)
*F16F 15/08* (2006.01)

(52) U.S. Cl.
CPC ........... *H04R 1/2873* (2013.01); *H04R 1/025* (2013.01); *F16F 15/08* (2013.01)

(58) Field of Classification Search
CPC ...... H04R 1/28; H04R 1/2869; H04R 1/2873; H04R 1/2876; H04R 1/02; H04R 1/105; H04R 1/08; H04R 1/025; H04R 1/026
USPC .......................... 381/353–354, 368, 386, 392
See application file for complete search history.

(56) References Cited

U.S. PATENT DOCUMENTS

| | | | | |
|---|---|---|---|---|
| 8,170,259 B2 * | 5/2012 | Liu | .......................... | H04R 1/02 381/365 |
| 2008/0116337 A1 * | 5/2008 | Kaneda | ................ | A47B 19/002 248/205.8 |
| 2013/0163805 A1 * | 6/2013 | Wang | ..................... | H04R 1/025 381/387 |
| 2014/0079264 A1 * | 3/2014 | Minarik | ................. | H04R 1/023 381/332 |
| 2014/0363038 A1 * | 12/2014 | Coleman | ............... | G09F 21/048 381/333 |

* cited by examiner

*Primary Examiner* — Suhan Ni
(74) *Attorney, Agent, or Firm* — WPAT, PC

(57) ABSTRACT

Provided are an anti-vibration structure of a speaker and an anti-vibration method for the same. A housing of the speaker has at least one annular pad mounted on a bottom portion of the housing to form at least one chamber respectively. Each of the at least one annular pad has an attachment surface. When the housing is rested on a placement surface, the attachment surface of each of the at least one annular pad is attached to the placement surface with a negative pressure effect generated by a pressure difference between the at least one chamber and air in the ambient environment, thereby ensuring an anti-slip effect and simultaneously providing an attachment force for absorbing shock generated when the speaker outputs sound.

20 Claims, 7 Drawing Sheets

ANTI-VIBRATION STRUCTURE OF A SPEAKER AND ANTI-VIBRATION METHOD FOR THE SAME

BACKGROUND OF THE INVENTION

1. Field of the Invention

The present invention relates to a speaker and, more particularly, to an anti-vibration structure of a speaker and an anti-vibration method for the same.

2. Description of the Related Art

To make exercise less boring, people who are exercising can carry portable, compact and lightweight speakers with them to enjoy music played by the speakers and share the music with other people around during their exercise.

As people who are exercising are on the move, the portable speakers are usually put on a table, the ground, or any other surface for placement to play music in a non-stop fashion. To allow people around to share the music, users of the speakers oftentimes turn the volume in a possible range up to its maximum, which results in vibration of the speakers because of the pumping sound waves generated by the speakers.

However, the vibration of the speakers may affect the listeners in an adverse way especially when the vibration of the speakers interrupts the tune of the music and when the speakers are displaced from the places at which they are initially located, sometimes causing the speakers to fall or slide to the ground.

SUMMARY OF THE INVENTION

An objective of the present invention is to provide an anti-vibration structure of a speaker and an anti-vibration method for the same, allowing the speaker to be able to avoid slipping, absorb shock, and provide an attachment force when attached on a table, the ground or other placement surface.

To achieve the foregoing objective, the anti-vibration structure of a speaker includes a housing and at least one annular pad.

The housing has a top portion and a bottom portion.

The at least one annular pad is mounted on the bottom portion of the housing. Each of the at least one annular pad has an attachment surface. A chamber is formed between a part of the bottom portion of the housing surrounded by the annular pad and a placement surface on which the attachment surface is attached.

When the attachment surface of the at least one annular pad is attached to the placement surface, a negative pressure effect is generated within the chamber such that the bottom portion of the housing is attached to the placement surface.

Preferably, the at least one annular pad is made of a flexible material, a resilient material, a silicone rubber material, or a shock-absorbent material.

Preferably, the hardness of each of the at least one annular pad is below Shore A50.

Preferably, the attachment surface of each of the at least one annular pad is processed by surface polishing, coating, or adhesively attaching a smooth or polished thin film.

Preferably, the housing has multiple sound holes formed through the top portion thereof.

Preferably, the anti-vibration structure includes multiple auxiliary annular pads. The at least one annular pad includes one annular pad and the multiple auxiliary annular pads are mounted on the bottom portion of the housing to surround the annular pad.

Preferably, the anti-vibration structure includes multiple auxiliary annular pads. The at least one annular pad includes one annular pad and the multiple auxiliary annular pads are mounted on the bottom portion of the housing and are located inside the chamber of the annular pad.

Given the foregoing structure, it is the at least one annular pad that is mounted on the bottom portion of the housing and is directly attached to a table, the ground, or other placement surface for operation. By attaching the attachment surface of the at least one annular pad to the placement surface to generate a negative pressure effect through the at least one chamber and the at least one annular pad, the housing is attached to the placement surface and simultaneously provides an anti-slip and shock-absorbent effect.

To achieve the foregoing objective, a housing of the speaker has a speaker unit accommodated in the housing is mounted on a placement surface for operation, and an anti-vibration method includes:

mounting at least one annular pad on a bottom portion of the housing to form at least one chamber respectively; and when the at least one annular pad is attached to the placement surface, generating a negative pressure effect by a pressure difference between each of the at least one chamber and an ambient environment for the bottom portion of the housing to be attached to the placement surface through the at least one annular pad.

Preferably, each of the at least one annular pad has an attachment surface attached to the placement surface and processed by a surface treatment.

Preferably, the surface treatment employs a process including surface polishing, coating, or adhesively attaching a smooth or polished thin film.

Given the foregoing method, it is the at least one annular pad that is mounted on the bottom portion of the housing and is directly attached to a table, the ground, or other placement surface for operation. By attaching the attachment surface of the at least one annular pad to the placement surface to generate a negative pressure effect through the at least one chamber and the at least one annular pad, the housing is attached to the placement surface and simultaneously provides an anti-slip and shock-absorbent effect.

Other objectives, advantages and novel features of the invention will become more apparent from the following detailed description when taken in conjunction with the accompanying drawings.

DETAILED DESCRIPTION OF THE INVENTION

Figure 1:
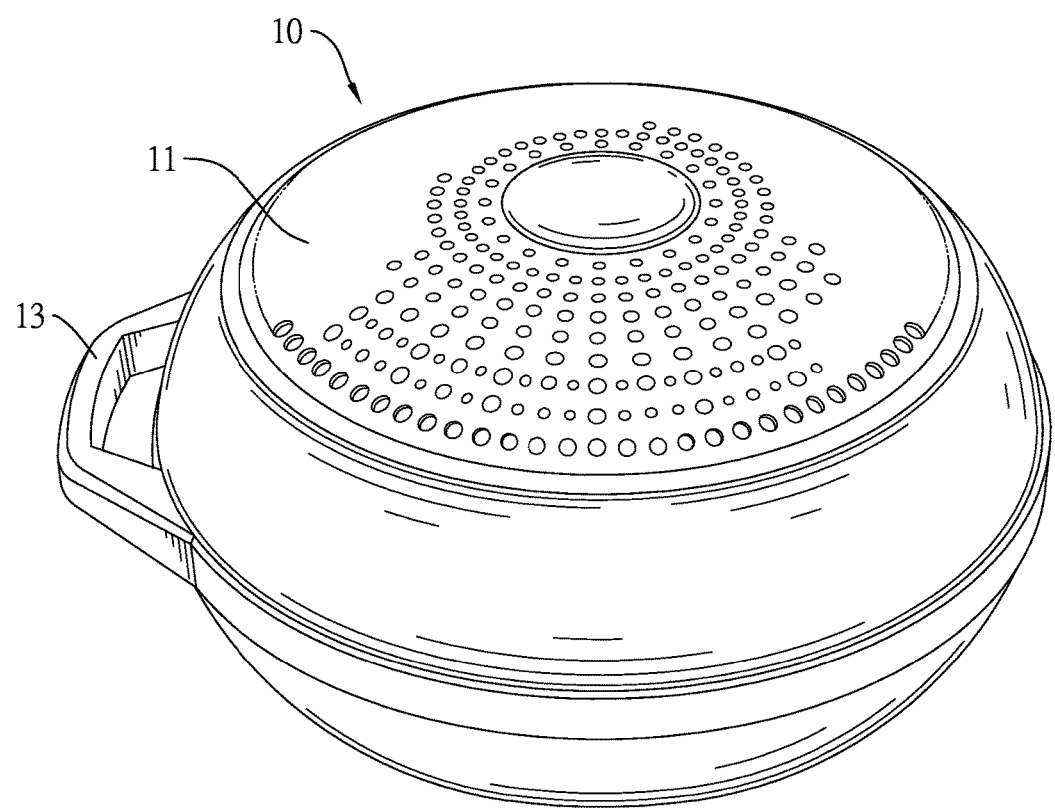
FIG. 1 is a perspective view of a first embodiment of an anti-vibration structure of a speaker in accordance with the present invention.
Figure 2:
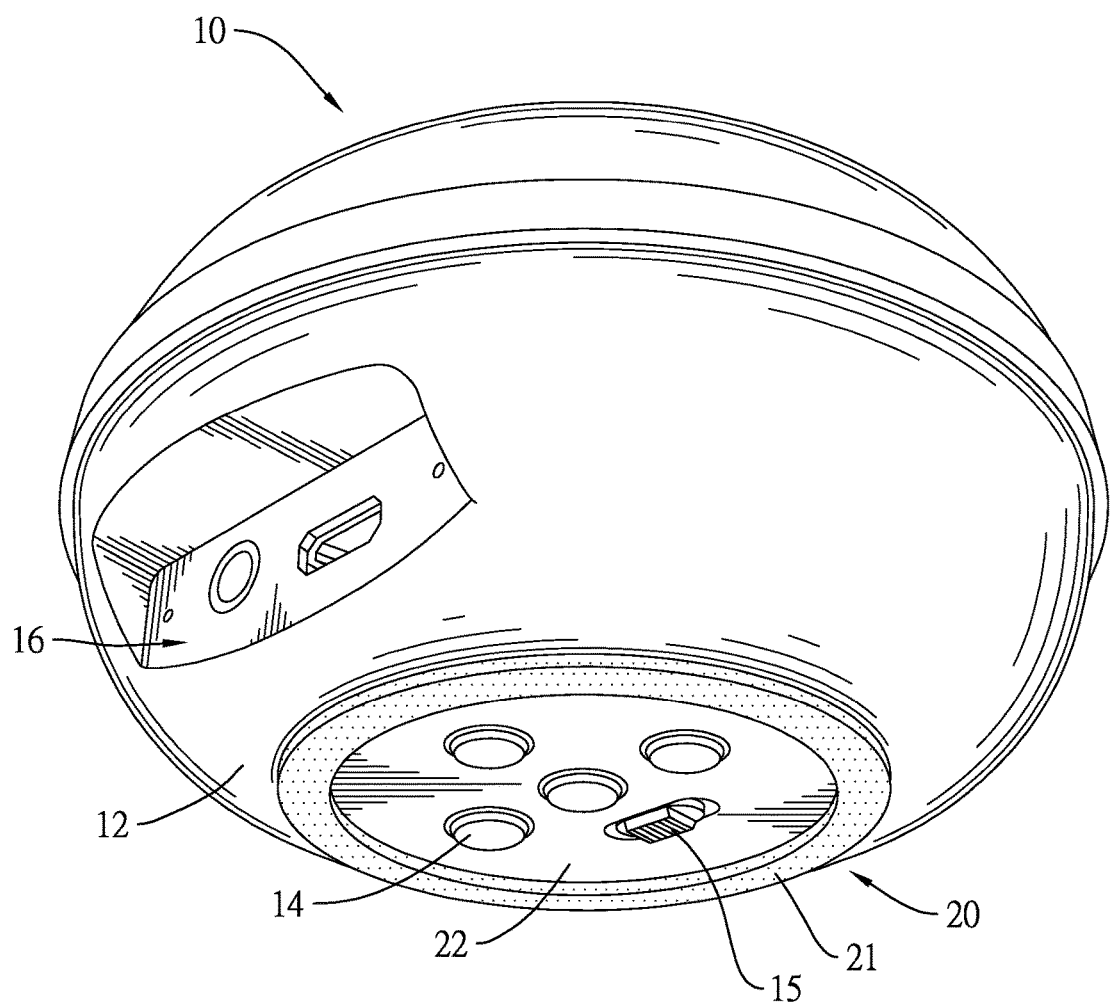
FIG. 2 is another perspective view of the anti-vibration structure in FIG. 1.

With reference to FIGS. 1 to 3 and 6, a first embodiment and a fourth embodiment of an anti-vibration structure of a speaker in accordance with the present invention includes a housing 10 and at least one annular pad 20. The at least one annular pad 20 includes one annular pad 20 in FIGS. 1 to 3 and three annular pads 20 in FIG. 6. The housing 10 includes but is not limited to a form of a disc, and has a top portion 11 and a bottom portion 12. In the first embodiment, one annular pad 20 is mounted on the bottom portion 12 of the housing 10 and the annular pad 20 has an attachment surface 21 formed on a bottom of the annular pad 20. A chamber 22 is formed between a part of the bottom portion 12 of the housing 10 surrounded by the annular pad 20 and a placement surface, such as a top surface of a table, a ground, or other surface for placement) on which the attachment surface 21 is attached. When the attachment surface 21 of the annular pad 20 is attached to the placement surface, the chamber 22 is hermetically sealed. Also because the weight of the speaker is exerted on the attachment surface 21, a pressure difference between the chamber 21 and an ambient environment creates a negative pressure effect within the chamber for the bottom portion 12 of the housing 10 to be attached to the placement surface through the annular pad 20 in an effort to reduce vibration of the speaker, thereby achieving an anti-slip effect and preventing vibration arising from a high volume of the speaker.

The at least one annular pad 20 is made of a flexible material, a resilient material, a silicone rubber material, or a shock-absorbent material. For example, the hardness of each of the at least one annular pad 20 is below Shore A50. Alternatively, a manufacturing treatment is done on the bottom of each of the at least one annular pad 20 to form the attachment surface 21 thereof. The manufacturing treatment may be a surface treatment including surface polishing, or coating or adhesively attaching a smooth thin film.

With further reference to FIG. 1, the housing 10 has multiple sound holes formed through the top portion 11 thereof for the speaker to output sound in an upward direction so as to raise a music-sharing effect. The housing 10 has a grip portion 13 formed on a lateral portion of the housing 10 for ease of carrying. Furthermore, with further reference FIG. 2, the housing 10 has multiple operation buttons 14, a power switch 15, and a power connection portion 16. The multiple operation buttons 14 and the power switch 15 are mounted on the bottom portion 12 of the housing 10. The power connection portion 16 is formed on a lateral portion of the bottom portion 12 of the housing 10 for connection with a power connector or other connector. As to places for mounting the multiple operation buttons 14 and the power switch 15, it is purely a choice of industrial design and has nothing to do with the negative pressure effect of the chamber 22.

Figure 3:
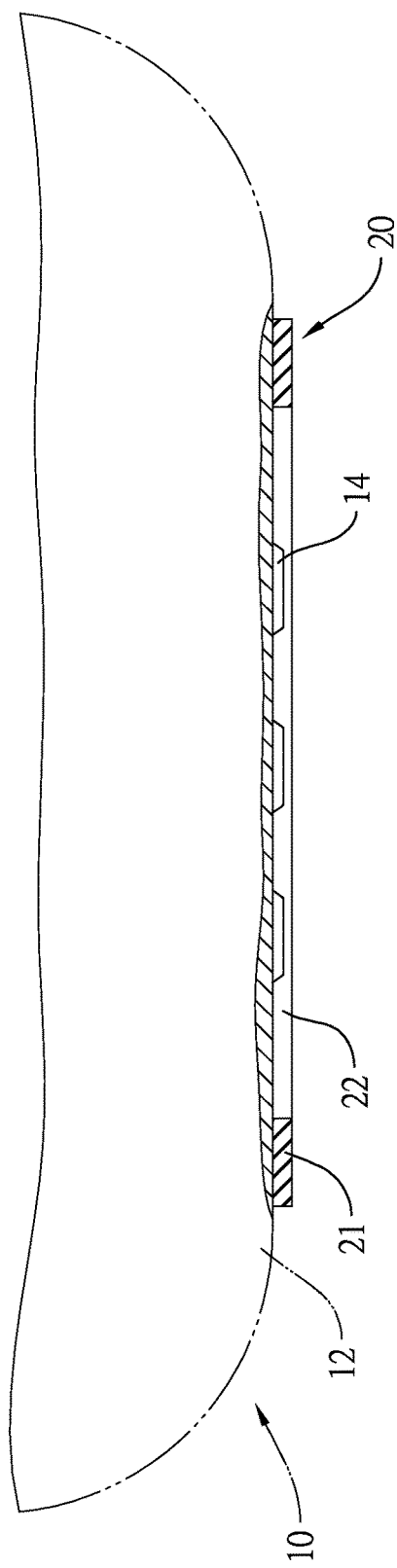
FIG. 3 is an enlarged side view in partial section of the anti-vibration structure in FIG. 1.
Figure 6:
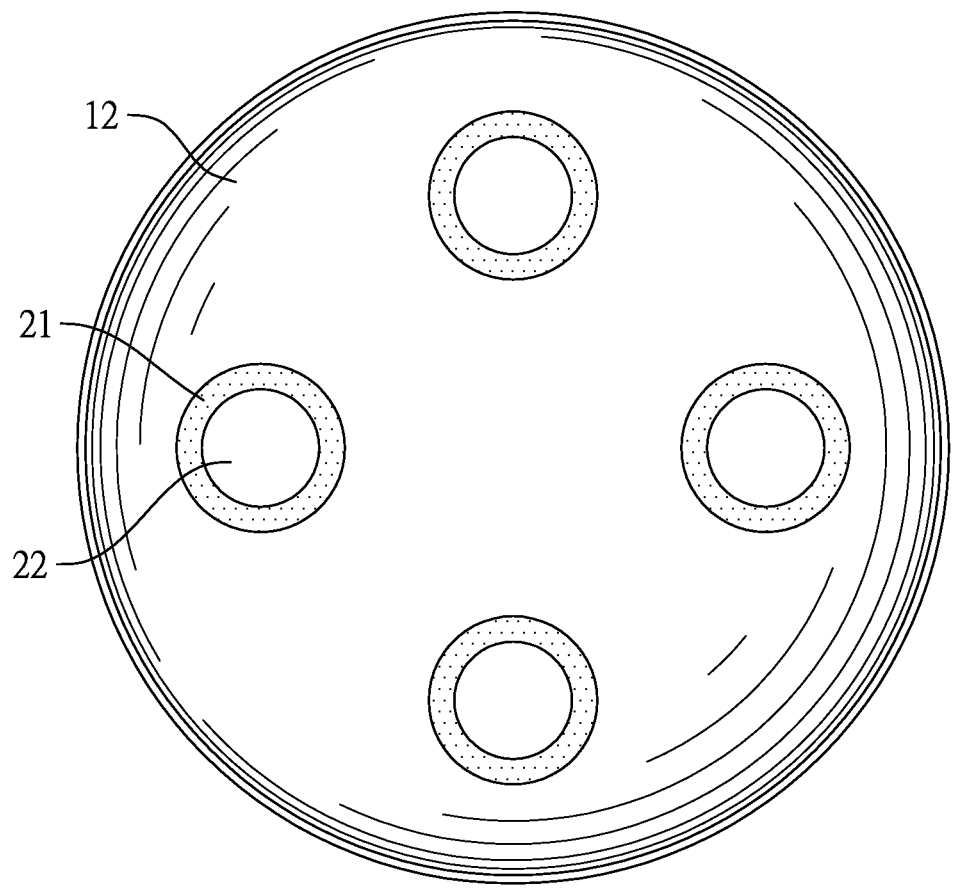
FIG. 6 is a bottom view of a fourth embodiment of an anti-vibration structure of a speaker in accordance with the present invention.

With further reference to FIGS. 3 and 6, by virtue of the at least one annular pad 20 mounted on the bottom portion 12 of the housing 10 and directly in planar contact with a top surface of a table, the ground, or other placement surface through the annular pad 20, a good attachment force can be provided against slip and vibration of the speaker. Hence, an anti-vibration method for the anti-vibration structure of the speaker in accordance with the present invention can be further induced by applying the housing 10 with a speaker unit accommodated therein to a placement surface for operation. The method mounts at least one annular pad 20 on the bottom portion 12 of the housing 10 to form at least one chamber 22 respectively. When the at least one annular pad 20 is attached to the placement surface, because the weight of the speaker is exerted on the attachment surface 21 of each of the at least one annular pad 20, a pressure difference between each of the at least one chamber 21 and an ambient environment creates a negative pressure effect for the bottom portion 12 of the housing 10 to be attached to the placement surface through the at least one annular pad 20 in an effort to reduce vibration of the speaker, thereby achieving an anti-slip effect and preventing vibration arising from a high volume of the speaker.

Figure 4:
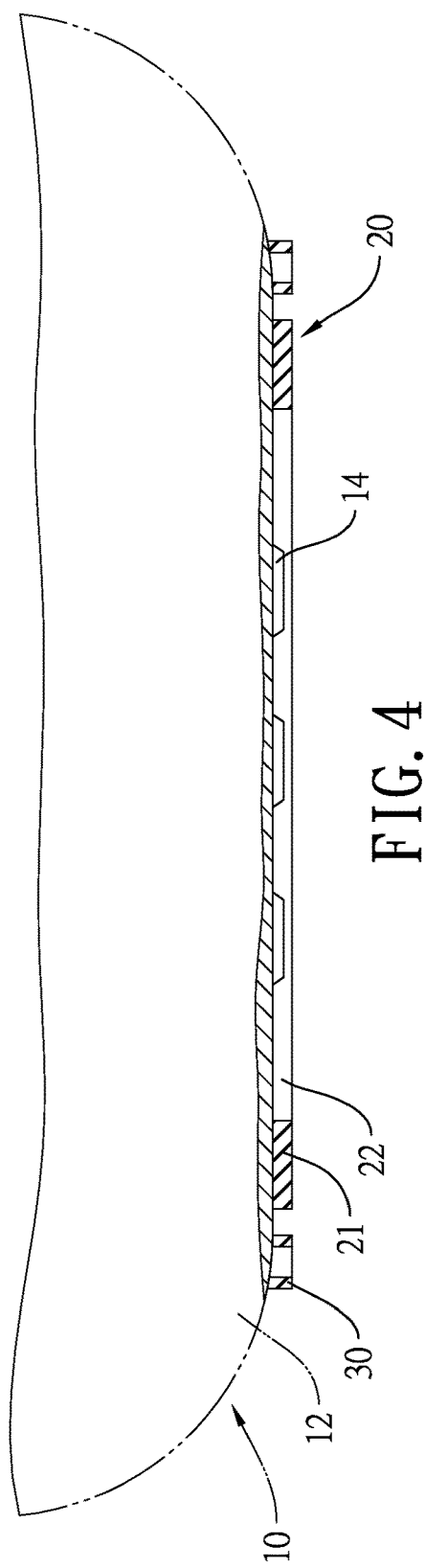
FIG. 4 is a side view in partial section of a second embodiment of an anti-vibration structure of a speaker in accordance with the present invention.

With reference to FIG. 4, a second embodiment of an anti-vibration structure of a speaker in accordance with the present invention differs from the foregoing embodiment in having additional multiple auxiliary annular pads 30. The multiple auxiliary annular pads 30 are structurally similar to the annular pad 20. In the present embodiment, the multiple auxiliary annular pads 30 are mounted on the bottom portion 12 of the housing 10 to surround the annular pad 20 for enhancement of the anti-slip and shock-absorbent effect.

Figure 5:
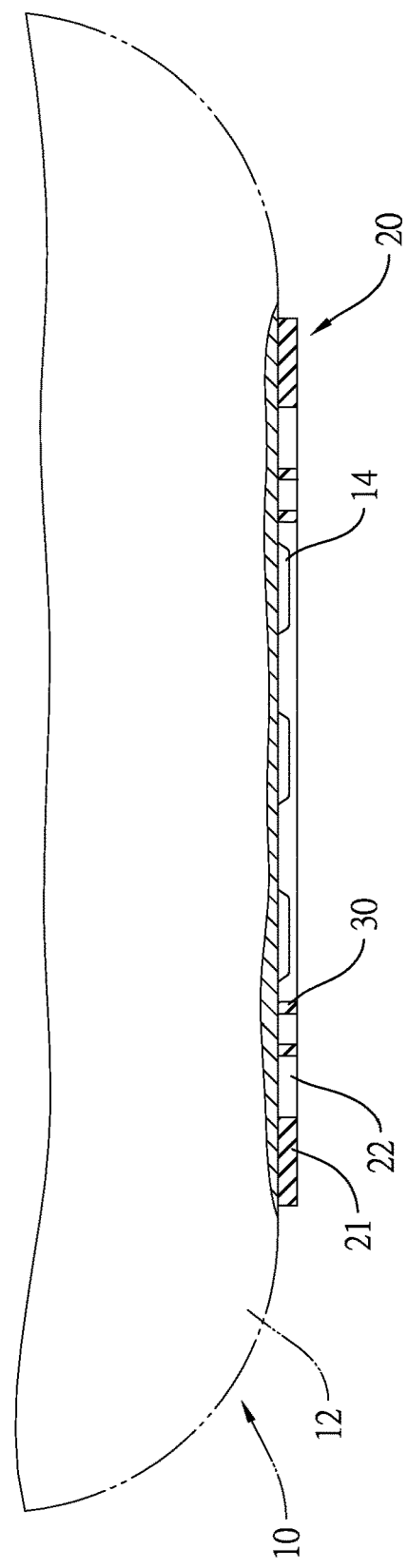
FIG. 5 is a side view in partial section of a third embodiment of an anti-vibration structure of a speaker in accordance with the present invention.

With reference to FIG. 5, a third embodiment of an anti-vibration structure of a speaker in accordance with the present invention differs from the second embodiment in the mounting location of the multiple auxiliary annular pads 30. In the present embodiment, the multiple auxiliary annular pads 30 are mounted on the bottom portion 12 of the housing 10 and are located inside the chamber 22 of the annular pad 20 for enhancement of the anti-slip and shock-absorbent effect.

Figure 7:
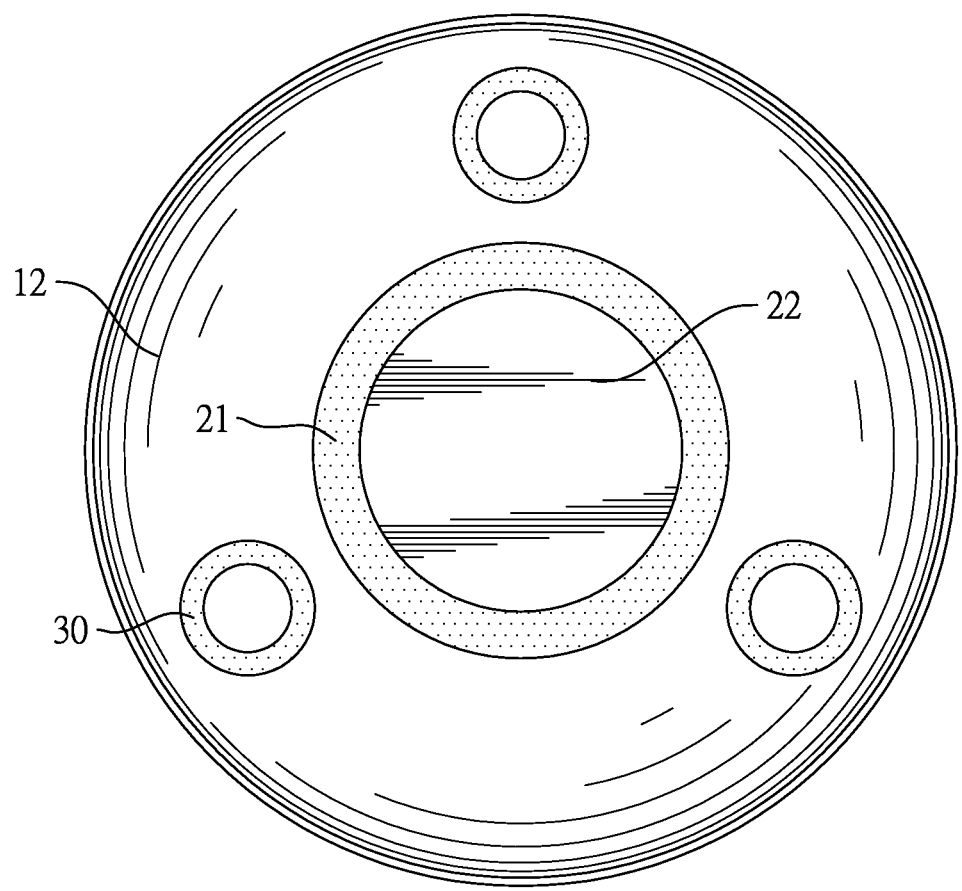
FIG. 7 is a bottom view of a fifth embodiment of an anti-vibration structure of a speaker in accordance with the present invention.

With reference to FIG. 6, the fourth embodiment of an anti-vibration structure of a speaker in accordance with the present invention differs from the first embodiment in having multiple annular pads 20. In the present embodiment, the multiple annular pads 20 are mounted on the bottom portion 12 of the housing 10 and each annular pad 20 has an attachment surface 21 and a chamber 22. There is no limitation imposed on the multiple annular pads 20 in terms of mounting location and size thereof. With reference to FIG. 7, a fifth embodiment of an anti-vibration structure of a speaker in accordance with the present invention differs from the second embodiment in the locations and the sizes of the multiple auxiliary annular pads 30. There is no limitation imposed on the multiple auxiliary annular pads 30 in terms of the locations and sizes thereof.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An anti-vibration structure of a speaker, comprising:
   a housing having a top portion and a bottom portion; and
   at least one annular pad mounted on the bottom portion of the housing, each of the at least one annular pad having an attachment surface, wherein a chamber is formed between a part of the bottom portion of the housing surrounded by the annular pad and a placement surface on which the attachment surface is attached;

wherein when the speaker is attached to the placement surface, the attachment surface of the at least one annular pad is attached to the placement surface in planar contact, and a negative pressure effect is generated within the chamber due to the weight of the speaker exerted on the at least one annular pad, such that the chamber is hermetically sealed, and the bottom portion of the housing is attached to the placement surface to achieve an anti-slip effect and prevent vibration arising from the speaker.

2. The anti-vibration structure as claimed in claim 1, wherein the at least one annular pad is made of a flexible material, a resilient material, a silicone rubber material, or a shock-absorbent material.

3. The anti-vibration structure as claimed in claim 2, wherein the attachment surface for each of the at least one annular pad is processed by surface polishing, coating, or attaching a smooth or polished thin film.

4. The anti-vibration structure as claimed in claim 3, wherein the housing has multiple sound holes formed through the top portion thereof.

5. The anti-vibration structure as claimed in claim 3, comprising multiple auxiliary annular pads, wherein the at least one annular pad includes one annular pad and the multiple auxiliary annular pads are mounted on the bottom portion of the housing to surround the annular pad.

6. The anti-vibration structure as claimed in claim 3, comprising multiple auxiliary annular pads, wherein the at least one annular pad includes one annular pad and the multiple auxiliary annular pads are mounted on the bottom portion of the housing and are located inside the chamber of the annular pad.

7. The anti-vibration structure as claimed in claim 1, wherein the hardness of each of the at least one annular pad is below Shore A50.

8. The anti-vibration structure as claimed in claim 7, wherein the attachment surface for each of the at least one annular pad is processed by surface polishing, coating, or attaching a smooth or polished thin film.

9. The anti-vibration structure as claimed in claim 8, wherein the housing has multiple sound holes formed through the top portion thereof.

10. The anti-vibration structure as claimed in claim 8, comprising multiple auxiliary annular pads, wherein the at least one annular pad includes one annular pad and the multiple auxiliary annular pads are mounted on the bottom portion of the housing to surround the annular pad.

11. The anti-vibration structure as claimed in claim 8, comprising multiple auxiliary annular pads, wherein the at least one annular pad includes one annular pad and the multiple auxiliary annular pads are mounted on the bottom portion of the housing and are located inside the chamber of the annular pad.

12. The anti-vibration structure as claimed in claim 1, wherein the attachment surface for each of the at least one annular pad is processed by surface polishing, coating, or attaching a smooth or polished thin film.

13. The anti-vibration structure as claimed in claim 12, wherein the housing has multiple sound holes formed through the top portion thereof.

14. The anti-vibration structure as claimed in claim 12, comprising multiple auxiliary annular pads, wherein the at least one annular pad includes one annular pad and the multiple auxiliary annular pads are mounted on the bottom portion of the housing to surround the annular pad.

15. The anti-vibration structure as claimed in claim 12, comprising multiple auxiliary annular pads, wherein the at least one annular pad includes one annular pad and the multiple auxiliary annular pads are mounted on the bottom portion of the housing and are located inside the chamber of the annular pad.

16. The anti-vibration structure as claimed in claim 1, wherein multiple operation buttons are mounted on the bottom portion of the housing and within the at least one annular pad.

17. An anti-vibration method for an anti-vibration structure of a speaker, wherein a housing of the speaker with a speaker unit accommodated in the housing is mounted on a placement surface for operation, the method comprising:

mounting at least one annular pad on a bottom portion of the housing to form at least one chamber respectively; and wherein when the speaker is attached to the placement surface, the attachment surface of the at least one annular pad is attached to the placement surface in planar contact, and a negative pressure effect is generated within the at least one chamber by a pressure difference between each of the at least one chamber and an ambient environment due to the weight of the speaker exerted on the at least one annular pad, such that the at least one chamber is hermetically sealed, and the bottom portion of the housing is attached to the placement surface through the at least one annular pad to achieve an anti-slip effect and prevent vibration arising from the speaker.

18. The method as claimed in claim 17, wherein each of the at least one annular pad has an attachment surface attached to the placement surface and processed by a surface treatment.

19. The method as claimed in claim 18, wherein the surface treatment employs a process including surface polishing, coating, or adhesively attaching a smooth or polished thin film.

20. The method as claimed in claim 17, wherein multiple operation buttons are mounted on the bottom portion of the housing and within the at least one annular pad.

* * * * *